United States Patent [19]

Chapet

[11] Patent Number: 4,590,033
[45] Date of Patent: May 20, 1986

[54] MULTI-LOBE COMPOSITE CASING FOR A MULTI-SCREW PROCESSING MACHINE

[75] Inventor: Marc Chapet, Unieux, France

[73] Assignee: CLEXTRAL, Paris, France

[21] Appl. No.: 695,153

[22] Filed: Jan. 28, 1985

[30] Foreign Application Priority Data

Jan. 26, 1984 [FR] France ............................... 84 01182

[51] Int. Cl.⁴ .............................................. B22F 7/00
[52] U.S. Cl. .......................................... 419/9; 419/28;
419/47; 29/DIG. 48; 148/6; 148/126.1;
219/76.16; 219/121 PJ; 219/121 PK; 228/196;
425/78; 425/79; 427/239
[58] Field of Search ............................ 419/8, 9, 18, 47;
29/DIG. 48; 148/6, 126.1; 219/76.16, 121 PJ,
121 PK; 228/196; 425/78, 79; 427/239

[56] References Cited

U.S. PATENT DOCUMENTS

| 4,065,302 | 12/1977 | Turillon | 419/49 |
| 4,145,481 | 3/1979 | Gupta et al. | 419/8 |
| 4,365,679 | 12/1982 | van Nederveen | 419/8 |
| 4,455,278 | 6/1984 | van Nederveen | 419/8 |

*Primary Examiner*—Stephen J. Lechert, Jr.
*Attorney, Agent, or Firm*—Pollock, Vande Sande & Priddy

[57] ABSTRACT

The invention relates to a multi-lobe composite casing, the inner wall of said casing being constituted by several adjacent cylindrical sectors, each enveloping a screw over the portion of the latter outside the penetration zone. According to the invention the hardest metal layer deposited on the inner wall of the body is applied in the form of a powder containing the desired constituents. This powder is welded to the metallic inner base wall by means of a plasma torch operating on the principle of a transferred arc or a semi-transferred arc. The invention is applied to machines with several overlapping screws of the extruder type.

4 Claims, 2 Drawing Figures

MULTI-LOBE COMPOSITE CASING FOR A MULTI-SCREW PROCESSING MACHINE

FIELD OF THE INVENTION

The invention relates to a multi-lobe composite casing for a material processing machine with several parallel screws.

BACKGROUND OF THE INVENTION

Material processing machines, and in particular extruders, comprise several parallel screws having threads whose pitch can vary along the axis and penetrate one into the other so as to draw the material along the threads by rotation of the screws. For this purpose, the screws are placed inside a casing with several lobes, each lobe having a cylindrical inner wall enveloping one screw over the portion of the periphery of the latter outside the penetration zone.

To control the conditions of advance of the material in the screws, it is generally necessary for the clearance between the periphery of the screw and the inner wall of the casing to be as small as possible. For this reason, the inner walls of the casing must be bored with precision and, in machines comprising several screws, the constitution of the casing in several lobes renders this operation delicate and laborious.

In addition, the mass of the casing and its inner wall must have different and often contradictory characteristics since they are subject to stresses which are not at all the same in depth and at the surface. In fact, in material processing machines, the casings are subject to thermal stresses due to operation between 150° and 300° C. and mechanical stresses created by the pressure of the extruded product thrust by the screws, which pressure can exceed 200 bars. On the other hand, the inner wall undergoes wear caused by the extruded product and by the friction of the screws and/or corrosion.

All these stresses consequently impose on the casing the need for particular and conflicting properties, since the outside must have moderate strength matched with good resilience and the inner wall must possess high resistance to fatigue cracking, high hardness, a low coefficient of friction and a high resistance to abrasion.

PRIOR ART

Casings are known in which jackets are used to cover the cylindrical sectors forming the different lobes, each jacket having the shape of a cylindrical segment which is supported outwardly on a solid housing surrounding the two screws and forming the body of the casing proper. This solid housing is provided to withstand the pressure exerted by the material drawn inside the casing, the jackets resisting only corrosion and wear. When each jacket entirely covers the sector of the corresponding casing, it must be extended to be coupled with the adjacent jacket forming a tip in the zone of interpenetration of the screws. It is difficult to avoid the existence of a small space between the adjacent edges of two jackets and this space must be welded and formed to avoid the accumulation therein of material which could present a drawback. Moreover, the body of the casing and its inner wall being constituted by separate parts, heat transmission between the heating elements placed around the casing and the material inside that casing takes place under poor conditions.

Jackets are also known which are formed either from a homogeneous material, the inner surface being subjected to a special heat treatment or a surface treatment, or from composite metal parts, and the hard material is then inserted by centrifugation into a steel envelope. However, this process generally results in insufficient fastening of the hard metal to the base metal.

SUMMARY OF THE INVENTION

It is therefore an object of the invention to provide a multi-lobe composite casing for a material processing machine with several screws, resisting wall stresses of high intensity and different in depth and at the surface.

According to the invention there is provided a multi-lobe composite casing wherein the hardest metal layer, deposited on the inner wall of the body of the casing having several lobes, is applied in the form of a powder containing the desired constituents and this powder is welded to the metal inner base wall by means of a plasma torch operating on the principle of the transferred arc or semi-transferred arc.

BRIEF DESCRIPTION OF THE DRAWINGS

Other advantages and features of the invention will emerge more clearly from the description which follows of an embodiment of the invention, given by way of non-limiting example and shown in the accompanying drawings, in which.

DETAILED DESCRIPTION

Figure 1:
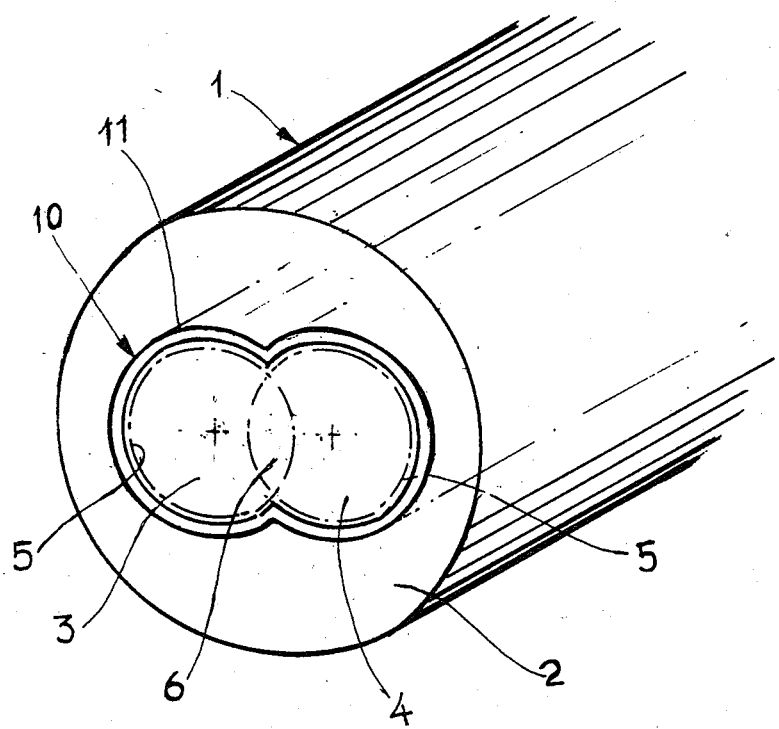
FIG. 1 shows a diagrammatic perspective view of an embodiment of a multi-lobe composite casing according to the invention.

The casing 1 shown in FIG. 1 is for a machine with two parallel screws, and is composed of a solid body 2 having two cylindrical bores 3, 4 forming two lobes for the passage of the screws. In the figure, there are shown in mixed lines two screws 5 which are rotated so as to ensure the advance of material inside the casing. Of course, the screws are rotated in the same direction of rotation if the threadings are identical and in reverse direction if the threads are reversed. However, in all cases, the two threadings penetrate into one another in a middle zone 6 placed between the two axis of the screws.

In order that the material may be entrained under good conditions in the machine, it is necessary for the two screws to be placed within a casing whose inner profile envelops the periphery of the screws with as small a clearance as possible, the tolerance depending particularly on the degree of viscosity of the material that it is desired to draw in the screws. As a result, the inner wall 10 of the casing is constituted by two coupled cylindrical sectors or lobes 3, 4; each of the sectors has an axis coinciding with that of a screw and a radius slightly greater than that of the screw, but which radius must be controlled with precision according to the tolerable clearance.

The body 2 of the casing 1 must have moderate strength matched with good resilience, while the inner wall 10 must possess high resistance to fatigue cracking, high hardness, a low coefficient of friction and high resistance to abrasion.

For this purpose, the casing 1 is formed from a metal body 2 of steel in which the inner wall 10 of the lobes (3, 4) is coated or metal-clad by means of a harder metallic layer 11 of compositions adapted to the particular operating conditions of the part, relative to the requirements of according as it is well to emphasize the abrasion resistance, corrosion resistance, resistance to mechanical fatigue or to friction.

This hard layer 11 is applied in the form of a powder, which is then welded to the base metal by means of a plasma torch operating on the principle of a transferred arc or a semi-transferred arc. This plasma torch constituting the heat source fuses simultaneously the surface of the part to be coated, as well as the metallizing product applied in powder form. A metallic bath is formed. The deposit is bonded to the substrate by a true metallurgical operation of the welding type.

Figure 2:
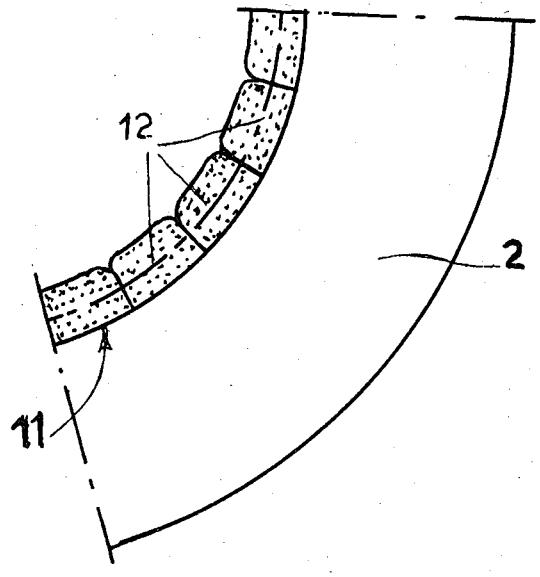
FIG. 2 shows a detailed view on a larger scale of the inner wall of the casing of FIG. 1.

Before the deposition of the hard layer 11, the lobes 3, 4 have a radius slightly greater than the final radius that it is desired to obtain, and said hard layer may have, according to the purpose aimed, a thickness comprised between 0.7 and 8 mm. The deposit of the layer 11 is produced in a single layer or in a multi-layer, by parallel and successive longitudinal passes as shown at 12 in FIG. 2. Then each cylindrical lobe 3, 4 is machined by grinding to obtain the desired radius.

The base metal used for the body of the casing may be:
1. A slightly alloyed steel such as:
   C %=0.20 to 1   Ni %=0 to 2.5
   Mn %=0.2 to 1.5   Cr %=0.5 to 6
   Si %=0.2 to 1   Mo %=0 to 2
   S %=0.005 to 0.012   V %=0 to 0.5
2. A martensitic stainless steel such as:
   C %=0.06 to 0.20   Mo %=0 to 1
   Cr %=13 to 17
   Ni %=0 to 4
3. An austenitic stainless steel such as:
   C %=0.06 to 0.12   Mo %=0 to 3
   Cr %=16 to 19   Cu %=0 to 4
   Ni %=4 to 12

In addition, the hardest metal layer constituting the inner wall of the casing may be constituted either by a high-speed steel, with chromium-tungsten, or with chromium-molybdenum, or with chromium associated at the same time with several elements such as tungsten, molybdenum, vanadium, cobalt, or by other hard deposits.

We give below an embodiment for an extruder casing having the following characteristics:
outer diameter: 320 mm
interaxial distance of the bores: 105 mm
bore diameter: 132 mm
length of the casing: 1350 mm
the material of the body of the casing is a steel composed of:
C=0.47%; Mn=0.90%; Si=0.24%; Ni=0.16%; Cr=1.02%
and the powder for the hard metallization is a high-speed steel of the composition:
C=0.85%; Mn=0.27%; Si=0.22%; Ni=0.15%; Cr=4.60%; Mo=5.15%; W=6.2%; V=2.05%; Co=0.4% preheating of the part: 400° C.

The hard surface hardens in the course of cooling, then is machined by grinding. The deposition having a thickness 2 to 4 mm in one layer is done by parallel and successive longitudinal passes. The hardness obtained on the deposit is 60 to 63 HRC.

The composite construction enables the selected steels to be adapted to their respective functions, viz., mechanical strength for the body of the casing, and fatigue strength and wear resistance for the operating layer, and represents an obvious economy in noble materials, since only the operating layer is produced from expensive materials. On the other hand, this construction also enables the production, in the hard layer deposited, of a homogeneous structure, with a fine distribution of hard particles, and without metallurgical defects of the inclusion or porosity type, liable to spoil the endurance properties of the material and its resistance to mechanical stresses. The use of a hard layer applied in the form of powder allows in particular the use of materials containing high proportions of carbides or other hard, very effective phases.

The performance of the copenetrating multiscrew extruder casings constructed according to the invention is increased with respect to prior art casings due to gains in the coefficient of friction and in wear resistance. Of course, the deposit of a hard layer on the inner wall by this method can also be employed for the remetallizing of worn casings.

I claim:
1. Process for the formation of a hard metallic layer on a metallic base wall of a multi-lobe composite casing, comprising the steps of
   (a) providing said hard metallic layer in the form of a powder containing desired constituents;
   (b) depositing said powder on an inner metallic base wall of said casing; and
   (c) welding said powder on said inner wall by means of a plasma torch operating on the transferred arc or semi-transferred arc principle.
2. Process according to claim 1, wherein deposition of said metallic layer is effected in a single layer or in a multi-layer by parallel and successive longitudinal passes, followed by machining by grinding.
3. Multi-lobe composite casing for a processing machine comprising at least two screws with parallel axes penetrating into one another and rotated in said casing, the latter being formed from a solid body of steel comprising an inner wall coated with a harder metal layer and constituted by several lobes each corresponding to one screw, wherein the body of the casing is constituted by a member of the group consisting of a slightly alloyed steel, a martensitic stainless steel and an austenitic stainless steel, and the metal layer is constituted either by a high-speed steel, with chromium-tungsten, or with chromium-molybdenum, or with chromium associated at the same time with several elements, such as tungsten, molybdenum, vanadium, cobalt or by other hard deposits.
4. Multi-lobe composite casing according to claim 3, wherein said metal layer has a thickness of 0.7 to 8 mm, depending on the purpose envisaged.

* * * * *